United States Patent Office.

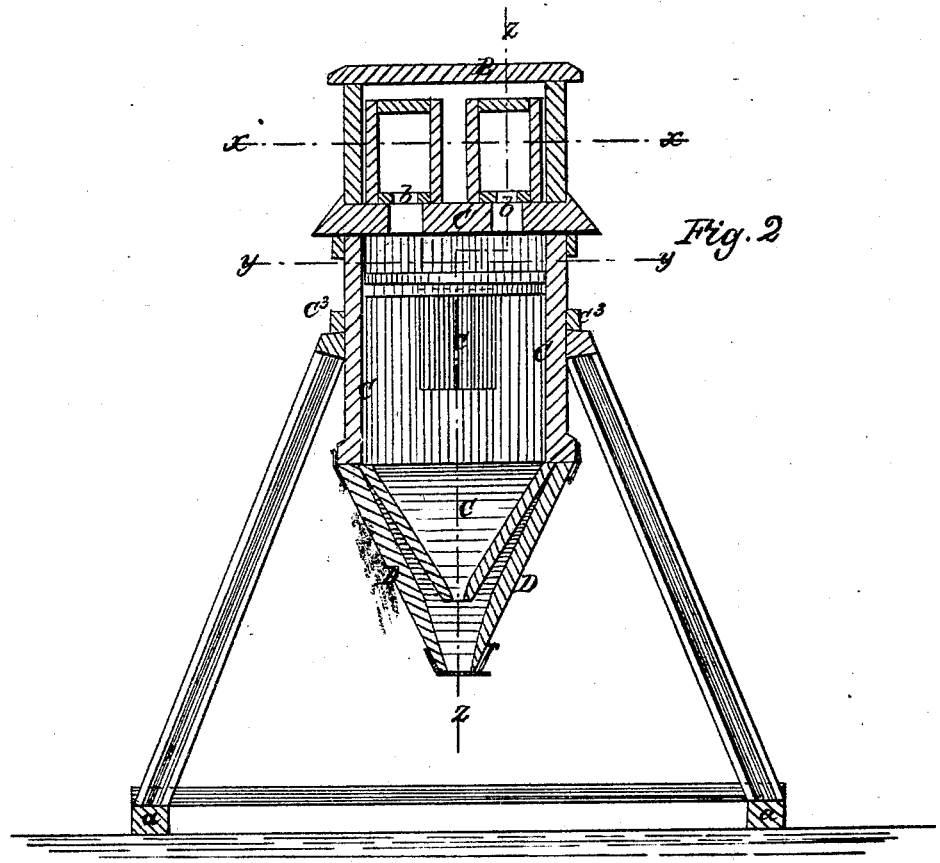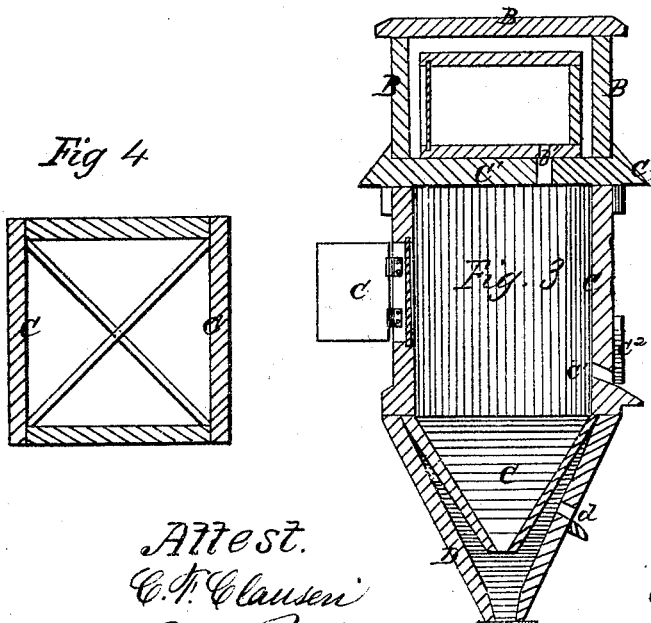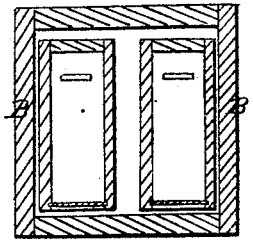

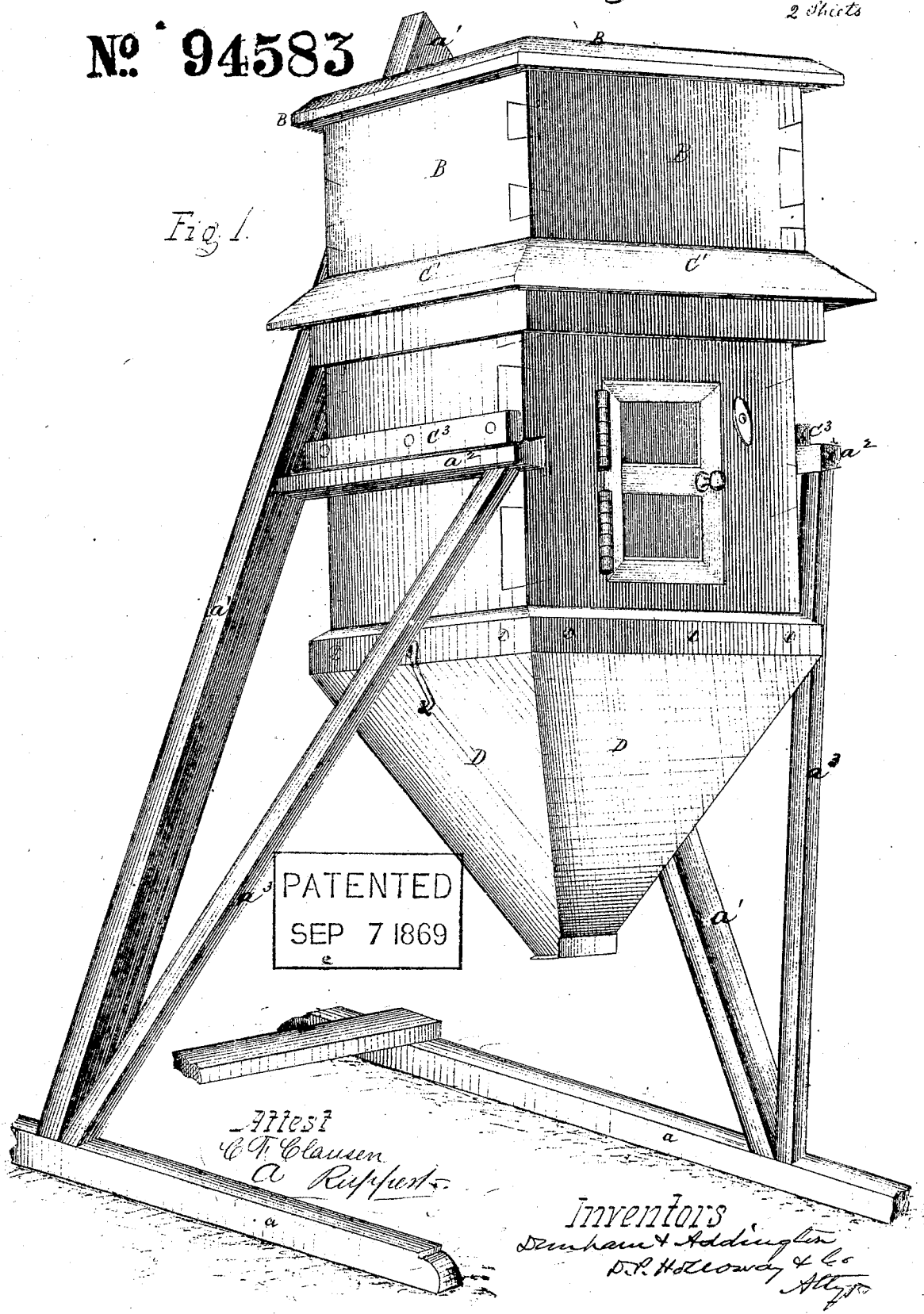

HOMER M. DUNHAM AND BISHOP ADDINGTON, OF CENTREVILLE, INDIANA.

Letters Patent No. 94,583, dated September 7, 1869.

IMPROVEMENT IN BEE-HIVES.

The Schedule referred to in these Letters Patent and making part of the same.

*To all whom it may concern:*

Be it known that we, HOMER M. DUNHAM and BISHOP ADDINGTON, of Centreville, in the county of Wayne, and State of Indiana, have invented a new and useful Improvement in Bee-Hives; and do hereby declare that the following is a full and exact description thereof, reference being had to the accompanying drawings, and to the letters of reference marked thereon.

Figure 1 represents a perspective view.
Figure 2 is a sectional elevation.
Figure 3 is a section on line $z\ z$ of fig. 2.
Figure 4 is a section on line $y\ y$ of fig. 2.
Figure 5 is a section on line $x\ x$ of fig. 3.

The same letters refer to like parts in the several figures.

Our invention relates to bee-hives; and

Our improvement consists in a truncated box, which is to be secured to the lower truncated portion of the hive, to serve the double purpose of a trap for catching miller-moths and other insects, which are so destructive to the bees and their honey, and of an anti-freezer, to protect the bees from the severe cold of winter.

It also consists in the construction of the frame upon which the hive rests, and its combination therewith.

To enable those skilled in the art to make and use our invention, we will proceed to describe its construction and operation.

A, in the drawings, represents the frame, consisting of the parallel timbers, or bars $a\ a$, forming the base of the same, from which project the slanting upright bars $a'\ a'$, meeting and united together on top.

At the proper height, two arms, $a^2\ a^2$, project horizontally from the upright bars, forming supports for the cleats by which the hive is suspended between these two arms.

The outer end of the arms is supported by the braces $a^3\ a^3$.

The base bars are to be secured together at one end by a transverse bar, as shown in the drawings.

B represents the upper chamber of the hive, in which we place two or more honey-boxes, which may be removed when full of honey by lifting off the chamber, which rests loosely in a frame on top of the main portion of the hive.

Passages $b\ b$ admit of the entrance and exit of the bees to and from these honey-boxes.

C represents the main chamber, in which the honey is made and stored by the bees for sustaining them during the winter. It is a square chamber, open on top, and its lower end terminating in a truncated form. Its top is to be provided with a suitable cover, C', upon which the upper chamber B rests.

A door, $c$, is to be arranged in one side of this chamber, in the usual manner.

The entrance and exit for the bees to this chamber is shown at $c^1$, which is to be closed during cold weather by a button, $c^2$.

To this portion of the hive two cleats, $c^3\ c^3$, are secured, on opposite sides thereof, by which it is suspended on the frame.

The lower end, which narrows down until it comes nearly to a point, is to be left open, so as to allow the offal, &c., to fall through this opening into the removable cap.

D represents the truncated box, or miller-trap, which is to be placed over the tapering end of the hive, to which it is held by hooks and staples, (as shown in the drawings,) or in any other convenient manner. Its form is to be such that its upper end makes a tight joint with the hive, from which its slanting sides gradually recede, so as to leave a space between it and the tapering end of the hive, as clearly shown in figs. 2 and 3. Its lower end is closed by a hinged piece of perforated sheet-metal or wire gauze.

It is a well-known fact that the miller-moth, and other insects which are troublesome to the bees will not enter their hives through the same opening that is provided at the regular entrance and exit for the bees, if they can find access at any other portion. We provide for this by the opening $d$ in the truncated box, through which the miller-moth will enter, and then, coming in contact with the lower end of the hive, they will deposit their eggs, which are to be removed from time to time by unhooking the cap and cleaning it. This cap, forming, with the lower portion of the hive, a double wall, with a layer of air between, serves also, very effectively, to protect the bees from the cold during winter.

Having thus described our invention—

What we claim, and desire to secure by Letters Patent, is—

1. The truncated box D, when constructed and arranged as and for the purpose set forth.

2. The combination of the upper chamber B, cover C', main chamber C, and truncated box D, all arranged as and for the purpose set forth.

3. In combination with a bee-hive, constructed substantially as shown and described, the frame A, when constructed substantially as set forth.

In testimony whereof, we have signed our names to this specification, in the presence of two subscribing witnesses.

HOMER M. DUNHAM.
BISHOP ADDINGTON.

Witnesses:
JOSEPH KANE,
W. A. PERLLE.